United States Patent
Hong

(10) Patent No.: US 10,832,037 B2
(45) Date of Patent: Nov. 10, 2020

(54) METHOD AND APPARATUS FOR DETECTING IMAGE TYPE

(71) Applicant: Baidu Online Network Technology (Beijing) Co., Ltd., Beijing (CN)

(72) Inventor: Zhibin Hong, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 37 days.

(21) Appl. No.: 16/129,421

(22) Filed: Sep. 12, 2018

(65) Prior Publication Data
US 2019/0205622 A1 Jul. 4, 2019

(30) Foreign Application Priority Data

Dec. 29, 2017 (CN) .......................... 2017 1 1477373

(51) Int. Cl.
*G06K 9/00* (2006.01)
*G06T 7/593* (2017.01)

(52) U.S. Cl.
CPC ..... *G06K 9/00288* (2013.01); *G06K 9/00228* (2013.01); *G06K 9/00899* (2013.01); *G06T 7/593* (2017.01); *G06K 9/00281* (2013.01); *G06K 2009/00328* (2013.01); *G06K 2209/21* (2013.01); *G06T 2207/10012* (2013.01); *G06T 2207/20081* (2013.01); *G06T 2207/30201* (2013.01)

(58) Field of Classification Search
CPC ........... G06K 9/00288; G06K 9/00899; G06K 9/00228; G06K 2209/21; G06K 9/00281; G06K 2009/00328; G06K 9/00214; G06K 9/00255; G06K 9/00906; G06T 7/593; G06T 2207/10012; G06T 2207/20081; G06T 2207/30201; G06F 21/32
See application file for complete search history.

(56) References Cited

U.S. PATENT DOCUMENTS

| 2011/0063097 A1* | 3/2011 | Naka | G06K 9/00208 340/435 |
| 2013/0169844 A1* | 7/2013 | Watts | H04N 5/265 348/239 |
| 2019/0019046 A1 | 1/2019 | Zhou | |

FOREIGN PATENT DOCUMENTS

CN 107506687 A 12/2017

* cited by examiner

*Primary Examiner* — Chuong A Ngo
(74) *Attorney, Agent, or Firm* — Nixon Peabody LLP

(57) ABSTRACT

Methods and apparatus for detecting an image type. A specific embodiment of the method includes: acquiring a first to-be-processed image and a second to-be-processed image; determining at least one first object image and at least one second object image in the first to-be-processed image and the second to-be-processed image respectively; and importing the first object image and the second object image corresponding to the first object image into an image type detection model to obtain image type information corresponding to the first object image and the second object image, for each of the at least one first object image, the image type detection model being used to determine an image type by depth of field information, and the image type information including a plane image and a stereo image. This embodiment enables accurate recognition of the image types of the to-be-processed images.

13 Claims, 5 Drawing Sheets

METHOD AND APPARATUS FOR DETECTING IMAGE TYPE

CROSS-REFERENCE TO RELATED APPLICATIONS

This application claims priority to Chinese Patent Application No. 201711477373.8, filed with the State Intellectual Property Office of the People's Republic of China (SIPO) on Dec. 29, 2017, the content of which is incorporated herein by reference in its entirety.

TECHNICAL FIELD

Embodiments of the present disclosure relate to the field of computer technology, specifically relate to the field of image processing technology, and more specifically relate to a method and apparatus for detecting an image type.

BACKGROUND

Facial recognition technology is a computer application research technology, belonging to biometric feature recognition technology. The biological features of a biological individual can not only provide distinctions for the biological individual, but can also determine the physical state of the biological individual. For example, a biological image may be used to determine whether the biological individual is a living body and whether it is in a fatigue state. The biological image may also be used as a judgment condition for unlocking, to prevent a presentation attack in order to increase the security of the device.

SUMMARY

The objective of embodiments of the present disclosure is to propose a method and apparatus for detecting an image type.

In a first aspect, the embodiments of the present disclosure provide a method for detecting an image type, including: acquiring a first to-be-processed image and a second to-be-processed image, wherein the first to-be-processed image and the second to-be-processed image are acquired when a positional relationship between a terminal device acquiring the images and a given object being captured is unchanged, and focal lengths of the terminal device when acquiring the first to-be-processed image and the second to-be-processed image are different; determining at least one first object image and at least one second object image in the first to-be-processed image and the second to-be-processed image respectively; and importing, for each first object image in the at least one first object image, the first object image and a second object image corresponding to the first object image into an image type detection model to obtain image type corresponding to the first object image and the second object image, the image type detection model being used to determine an image type by depth of field information, and the image type including a plane image and a stereo image.

In some embodiments, the determining at least one first object image and at least one second object image in the first to-be-processed image and the second to-be-processed image respectively includes: performing image recognition on the first to-be-processed image and the second to-be-processed image, and determining the at least one first object image and the at least one second object image corresponding to the first to-be-processed image and the second to-be-processed image.

In some embodiments, the determining at least one first object image and at least one second object image in the first to-be-processed image and the second to-be-processed image respectively includes: setting first position information for each first object image in the at least one first object image, setting second position information for each second object image in the at least one second object image, and establishing a first correspondence relationship between the first position information and the second position information; and establishing a second correspondence relationship between the first object image and the second object image based on the first correspondence relationship.

In some embodiments, the method further includes constructing the image type detection model, and the constructing the image type detection model include: extracting a stereo image group and a plane image group from a stereo image set and a plane image set, respectively, wherein the stereo image group includes two images of different focal lengths acquired when a positional relationship between the terminal device acquiring the images and a given spatial object being captured is unchanged, and the plane image group includes two images of different focal lengths acquired when a positional relationship between the terminal device acquiring the images and a given plane object being captured is unchanged; acquiring stereo depth of field information and plane depth of field information from the stereo image group and the plane image group, respectively, and setting a stereo image type label and a plane image type label respectively for the stereo image group and the plane image group corresponding to the stereo depth of field information and the plane depth of field information; and obtaining the image type detection model through training, by using a machine learning method, with the stereo image group and the plane image group as inputs, and the stereo image type label and the plane image type label respectively corresponding to the stereo image group and the plane image group as outputs.

In some embodiments, the stereo image set includes a face stereo image, and the acquiring stereo depth of field information from the stereo image group, and setting a stereo image type label for the stereo image group corresponding to the stereo depth of field information includes: acquiring face depth of field information from a face stereo image group, and setting a face image type label for the face stereo image group corresponding to the face depth of field information.

In some embodiments, the method further includes: issuing an alarm signal when an image type corresponding to the first object image and the second object image is a plane image.

In a second aspect, the embodiments of the present disclosure provide an apparatus for detecting an image type, including: an image acquisition unit, configured to acquire a first to-be-processed image and a second to-be-processed image, wherein the first to-be-processed image and the second to-be-processed image are acquired when a positional relationship between a terminal device acquiring the images and a given object being captured is unchanged, and focal lengths of the terminal device when acquiring the first to-be-processed image and the second to-be-processed image are different; an object image determination unit, configured to determine at least one first object image and at least one second object image in the first to-be-processed image and the second to-be-processed image respectively;

and an image type determination unit, configured to import, for each first object image in the at least one first object image, the first object image and a second object image corresponding to the first object image into an image type detection model to obtain image type corresponding to the first object image and the second object image, the image type detection model being used to determine an image type by depth of field information, and the image type including a plane image and a stereo image.

In some embodiments, the object image determination unit includes: perform image recognition on the first to-be-processed image and the second to-be-processed image, and determine the at least one first object image and the at least one second object image corresponding to the first to-be-processed image and the second to-be-processed image.

In some embodiments, the object image determination unit further includes: a first correspondence relationship establishing subunit, configured to set first position information for the each first object image in the at least one first object image, set second position information for each second object image in the at least one second object image, and establish a first correspondence relationship between the first position information and the second position information; and a second correspondence relationship establishing subunit, configured to establish a second correspondence relationship between the first object image and the second object image based on the first correspondence relationship.

In some embodiments, the apparatus includes an image type detection model construction unit configured to construct the image type detection model, and the image type detection model construction unit includes: an image extraction subunit, configured to extract a stereo image group and a plane image group from a stereo image set and a plane image set, respectively, wherein the stereo image group includes two images of different focal lengths acquired when a positional relationship between the terminal device acquiring the images and a given spatial object being captured is unchanged, and the plane image group includes two images of different focal lengths acquired when a positional relationship between the terminal device acquiring the images and a given plane object being captured is unchanged; a label setting subunit, configured to acquire stereo depth of field information and plane depth of field information from the stereo image group and the plane image group, respectively, and set a stereo image type label and a plane image type label respectively for the stereo image group and the plane image group corresponding to the stereo depth of field information and the plane depth of field information; and an image type detection model construction subunit, configured to obtain the image type detection model through training, by using a machine learning method, with the stereo image group and the plane image group as inputs, and the stereo image type label and the plane image type label respectively corresponding to the stereo image group and the plane image group as outputs.

In some embodiments, the stereo image set includes a face stereo image, and the label setting subunit includes: acquire face depth of field information from a face stereo image group, and set a face image type label for the face stereo image group corresponding to the face depth of field information.

In some embodiments, the apparatus further includes: issue an alarm signal when an image type corresponding to the first object image and the second object image is a plane image.

In a third aspect, the embodiments of the present disclosure provide a terminal device, including: one or more processors; and a storage apparatus, for storing one or more programs, a zoom lens assembly, for capturing images of different focal lengths, the one or more programs, when executed by the one or more processors, cause the one or more processors to implement the method for detecting an image type according to the first aspect.

In a fourth aspect, the embodiments of the present disclosure provide a computer readable storage medium, storing a computer program thereon, the program, when executed by a processor, implements the method for detecting an image type according to the first aspect.

The method and apparatus for detecting an image type provided by the embodiments of the present disclosure first acquires a first object image and a second object image from a first to-be-processed image and a second to-be-processed image captured at different focal lengths, then imports the first object image and the second object image into an image type detection model to determine image type of the first object image and the second object image, enabling accurate recognition of the image types of the to-be-processed images.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
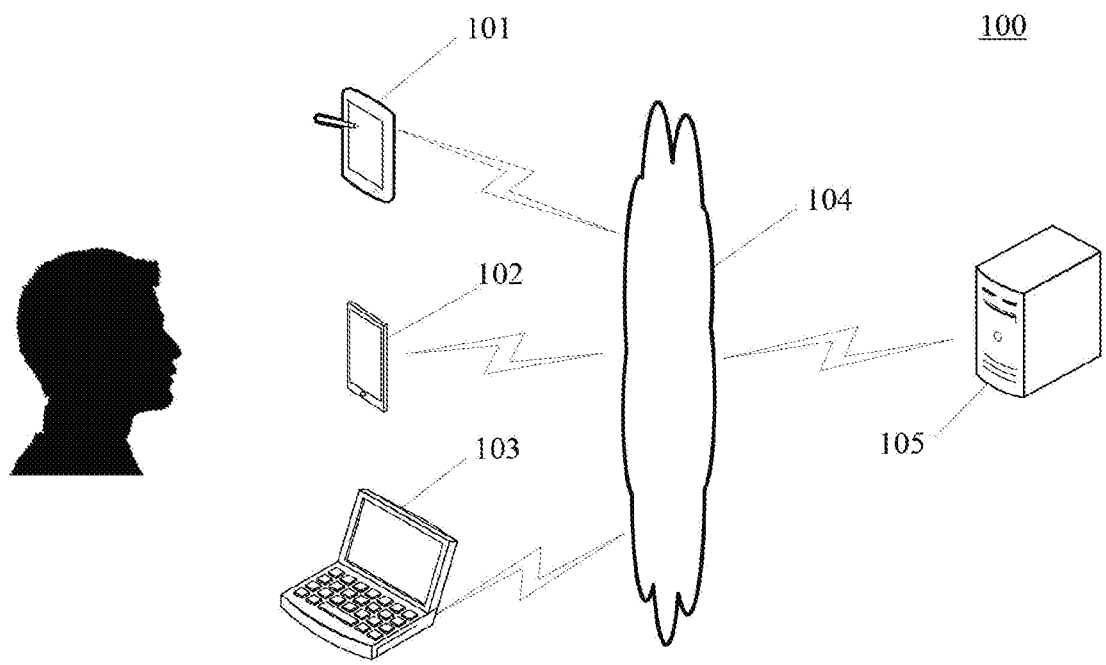
FIG. 1 is an exemplary system architecture diagram to which the present disclosure may be applied.

FIG. 1 shows an exemplary architecture of a system 100 in which a method for detecting an image type or an apparatus for detecting an image type according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as camera applications, video capturing applications, face security detection applications, or blink detection applications may be installed on the terminal devices 101, 102 and 103.

The terminal devices 101, 102 and 103 may be various electronic devices having an display screen and supporting video capturing, including but not limited to, IP cameras, surveillance cameras, smart phones, tablet computers, laptop computers and desktop computers.

The server 105 may be a server providing various services, for example, a server executing image processing on the images captured by the terminal devices 101, 102 or 103. The server may perform facial recognition, image recognition and blink detection on the received data, and return a processing result to the terminal devices.

It should be noted that the method for detecting an image type according to the embodiments of the present disclosure is generally executed by the terminal devices 101, 102 and 103. Accordingly, an apparatus for detecting an image type is generally installed on the terminal devices 101, 102 and 103.

It should be appreciated that the numbers of the terminal devices, the networks and the servers in FIG. 1 are merely illustrative. Any number of terminal devices, networks and servers may be provided based on the actual requirements.

Figure 2:
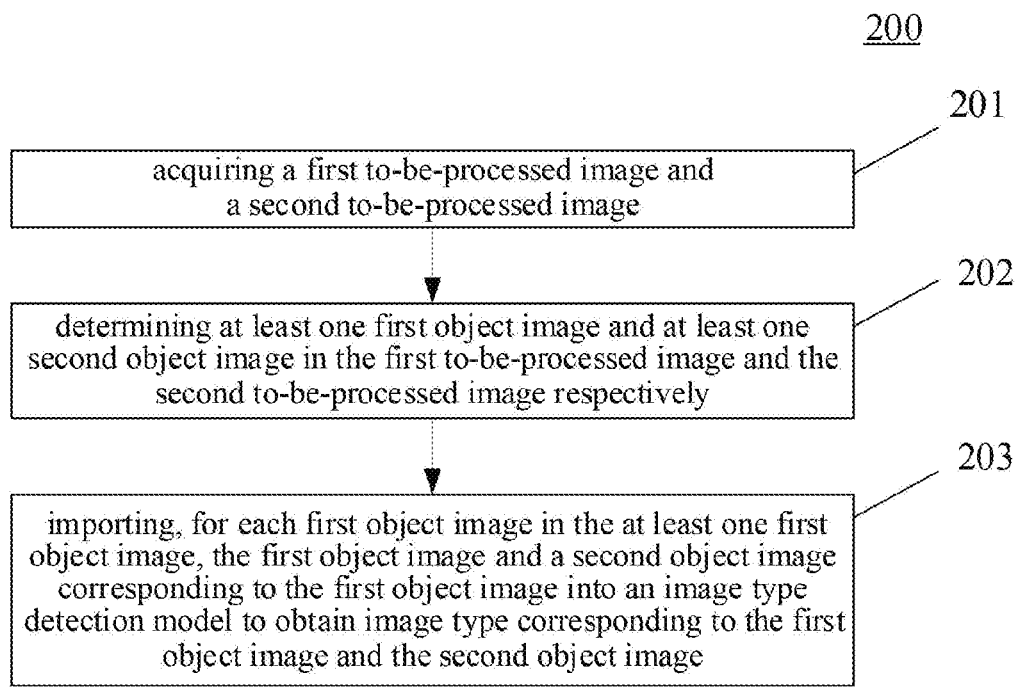
FIG. 2 is a flowchart of an embodiment of a method for detecting an image type according to the present disclosure.

With further reference to FIG. 2, a flow 200 of an embodiment of the method for detecting an image type according to the present disclosure is illustrated. The method for detecting an image type includes the following steps:

Step 201, acquiring a first to-be-processed image and a second to-be-processed image.

In the present embodiment, the electronic device (e.g., the terminal devices 101, 102, 103 as shown in FIG. 1) on which the method for detecting an image type operate may receive a first to-be-processed image and a second to-be-processed image from the terminal with which the user performs image acquisition through a wired connection or a wireless connection. Here, the first to-be-processed image and the second to-be-processed image are acquired when a positional relationship between the terminal device acquiring the images and a given object being captured is unchanged, and the focal lengths of the terminal device when acquiring the first to-be-processed image and the second to-be-processed image are different. Alternatively, the focal length may range from 20 mm to 200 mm. It should be noted that the wireless connection may include, but is not limited to, 3G/4G connection, WiFi connection, Bluetooth connection, WiMAX connection, Zigbee connection, UWB (ultra wideband) connection, and other wireless connections known by now or to be developed in the future.

With the development of the face recognition technology, the approach of unlocking by inputting a password or recognizing a fingerprint has been, to some extent, replaced by recognizing a face. In order to prevent others from unlocking the smart device by a presentation attack method such as using a face photo, the existing method usually adds an operation such as "blinking" when performing the face unlocking, in order to improve the security of the face unlocking. However, if someone acquires a blinking video of the owner of the smart device, there is also the possibility of unlocking the smart device with the video.

In practice, the lens assembly that captures the images usually has a zoom function, and for a given real face, the face images captured at different focal lengths are different. To this end, the embodiments of the present disclosure may acquire the first to-be-processed image and the second to-be-processed image at different focal lengths, and then estimate the object being captured in the first to-be-processed image and the second to-be-processed image to improve the recognition accuracy of the object being captured. For example, when it is necessary to unlock the terminal devices 101, 102, 103 or unlock an application on the terminal devices 101, 102, 103 by the face, the terminal devices 101, 102, 103 may control the lens assembly to capture face images at different focal lengths to obtain a first to-be-processed image and a second to-be-processed image. It should be noted that the object being captured for unlocking may be other objects in addition to the face, depending on actual needs.

Step 202, determining at least one first object image and at least one second object image in the first to-be-processed image and the second to-be-processed image respectively.

When the zoom lens assembly is acquiring the first to-be-processed image and the second to-be-processed image, the first to-be-processed image and the second to-be-processed image may include images of a plurality of objects. In order to analyze the images of an object, it is necessary to identify object images respectively included in the first to-be-processed image and the second to-be-processed image.

In some alternative implementations of the present embodiment, the determining at least one first object image and at least one second object image in the first to-be-processed image and the second to-be-processed image respectively may include: performing image recognition on the first to-be-processed image and the second to-be-processed image, and determining the at least one first object image and the at least one second object image corresponding to the first to-be-processed image and the second to-be-processed image.

After acquiring the first to-be-processed image and the second to-be-processed image, the first to-be-processed image and the second to-be-processed image may be respectively image-processed by the image recognition method to recognize object images respectively contained in the first to-be-processed image and the second to-be-processed image.

In some alternative implementations of the present embodiment, the determining at least one first object image and at least one second object image in the first to-be-processed image and the second to-be-processed image respectively may further include the following steps:

The first step, setting first position information for the each first object image in the at least one first object image, setting second position information for each second object image in the at least one second object image, and establishing a first correspondence relationship between the first position information and the second position information.

The first to-be-processed image and the second to-be-processed image are captured by the zoom lens assembly at different focal lengths, therefore, the first to-be-processed image and the second to-be-processed image contain images of a plurality of identical objects. In order to analyze the object images subsequently, it is necessary to establish a correspondence relationship between object images corresponding to an identical object in the first to-be-processed image and the second to-be-processed image. The present embodiment may set first position information for each first object image in the first object images, set second position information for each second object image in the second object images, and then establish a first correspondence relationship between the first position information and the second position information corresponding to the identical object.

The second step, establishing a second correspondence relationship between the first object image and the second object image based on the first correspondence relationship.

After obtaining the first correspondence relationship, a second correspondence relationship between the first object image corresponding to the first position information and the second object image corresponding to the second position information may be determined, the first position information and the second position information being in the first correspondence relationship.

Step 203, importing, for each first object image in the at least one first object image, the first object image and a second object image corresponding to the first object image into an image type detection model to obtain image type corresponding to the first object image and the second object image.

The image type detection model of the present embodiment may be used to determine the image type by the depth of field information. When determining the image type of the object image, two object images of an identical object may be imported into the image type detection model for recognition, and the image type detection model outputs image type of the first object image and the second object image based on the characteristics of the inputted two object images. Here, the image type detection model may be a correspondence relationship table pre-established by a technician based on statistics of a large number of object images and image type, and storing correspondence relationships between a plurality of object images and the image types; or may be a calculation formula for performing numerical calculation on the object images to obtain a calculation result for representing the image type, and pre-established by a technician based on statistics of a large number of data and stored to the electronic device. For example, the calculation formula may be a formula for performing feature calculation on object images of an identical object acquired by the lens assembly at different focal lengths. The image type in the present embodiment may include a plane image and a stereo image. In this embodiment, the image type may be divided into a stereo image and a plane image. Here, the stereo image may be an image acquired by the lens assembly when the lens-facing side of the object is a stereo structure, for example, when a face is facing the lens assembly, the image acquired by the lens assembly may be regarded as a stereo image; the plane image may be an image acquired by the lens assembly when the lens-facing side of the object is a plane structure, for example, an image acquired by the lens assembly facing the desktop of the desk may be regarded as a plane image.

In some alternative implementations of the present embodiment, the method may further include constructing the image type detection model, and the constructing the image type detection model may include the following steps:

The first step, extracting a stereo image group and a plane image group from a stereo image set and a plane image set, respectively.

In order to obtain the image type detection model, various image types need to be analyzed and processed. The images of the stereo structure and the plane structure acquired at different focal lengths have significantly different image features, and thus may be used to obtain the image type detection model required by the present embodiment. First, a stereo image group and a plane image group may be extracted from a stereo image set and a plane image set, respectively. Here, the stereo image group includes two images of different focal lengths acquired when a positional relationship between the terminal device acquiring the images and the spatial object being captured is unchanged, for example, in the case where the face and the lens assembly are relatively stationary to each other, two images of the front face acquired by the lens assembly at different focal lengths. The plane image group includes two images of different focal lengths acquired when a positional relationship between the terminal device acquiring the images and the plane object being captured is unchanged. For example: two images of the desktop of the desk acquired at different focal lengths by the lens assembly, when the lens assembly is facing the desktop of the desk and is relatively stationary.

The second step, acquiring stereo depth of field information and plane depth of field information from the stereo image group and the plane image group, respectively, and setting a stereo image type label and a plane image type label respectively for the stereo image group and the plane image group corresponding to the stereo depth of field information and the plane depth of field information.

When the focal length changes, the stereo image and the plane image show significantly different image features. Therefore, the embodiments of the present disclosure may recognize stereo images and plane images by the depth of field information in the image features. Here, the depth of field refers to, at front of a camera lens assembly or other imaging devices, the distance that ranges from a nearest to a furthest being-captured-objects that can form sharp images. The aperture, the lens assembly, and the distance of the being-captured-object are important factors affecting the depth of field. After the focusing is completed, the objects in a certain distance ranges before and after the focus can form sharp images, and the certain distance ranges before and after the focus is referred to as the depth of field. There is a certain length of space at front of the lens assembly (before and after the focus adjustment), when the being-captured-object is in this certain length space, its image on the negative film is just between the two circles of confusion before and after the focus. The length of the space in which the object being captured is located is referred to as the depth of field. The corresponding feature information (such as lines, sharpness and color) of the depth of field on the image may be regarded as the depth of field information. The depth of field information may be acquired by information calculation, information extraction, etc. Then, the depth of field information is divided into stereo depth of field information and plane depth of field information according to the stereo image and the plane image. Finally, a stereo image type label may be set for the stereo depth of field information, and a plane image type label may be set for the plane image group respectively.

The third step, obtaining the image type detection model through training, by using a machine learning method, with the stereo image group and the plane image group as inputs, and the stereo image type label and the plane image type label respectively corresponding to the stereo image group and the plane image group as outputs.

The electronic device of the present embodiment may obtain the image type detection model through training, by using a machine learning method, with the stereo image group and the plane image group as inputs, and the stereo image type label and the plane image type label respectively corresponding to the stereo image group and the plane image group as outputs. Specifically, the electronic device may use a model for classification such as a deep learning network, a Naive Bayesian Model (NBM) or a Support Vector Machine (SVM), train the model by using the machine learning method, with the stereo image group as the input of the model, and the stereo image type label corresponding to the stereo image group as the output of the model, and at the same time with the plane image group as the input of the model, the plane image type label corresponding to the plane image group as the output of the model, to obtain the image type detection model.

In some alternative implementations of the present embodiment, the stereo image set includes a face stereo image, and the acquiring stereo depth of field information from the stereo image group, and setting a stereo image type label for the stereo image group corresponding to the stereo depth of field information may include: acquiring face depth of field information from the face stereo image group, and setting a face image type label for the face stereo image group corresponding to the face depth of field information.

The stereo image set may contain a plurality of types of stereo images. Alternatively, the stereo image set of the present embodiment includes the face stereo image. A face stereo image group is composed by selecting images of a given real face acquired at different focal lengths from the face stereo images. Then, face depth of field information of the face stereo image group may be obtained, and the face depth of field information may reflect the stereoscopic structure of the face. Then, the face image type label is set for the face depth of field information. Finally, the correspondence relationships between the various face stereo image groups and the face image type labels are established by using the machine learning method. In this way, when the received first object image and the second object image include a face stereo image, the image type detection model obtained by training may output a corresponding face image type label, thereby realizing the recognition of the face stereo image.

In some alternative implementations of the present embodiment, the method further includes: issuing an alarm signal when an image type corresponding to the first object image and the second object image is a plane image.

The above steps may determine the image type corresponding to an object image. In some scenarios, after the image type of the object image is recognized, different data processing needs to be performed based on different image types. For example, in a face unlocking scenario, when the image type of a face image is detected as a stereo image, it needs to be further determined whether the stereo image is a face stereo image, in the affirmative, the face image captured by the lens assembly is considered to be correspond to a real face, that is, the image captured by the lens assembly is a face image of a living body. At this time, it may be considered as a safe unlocking (the face of the living body should also be a face corresponding to the unlocking). When the image type of the face image is detected as a plane image, or although it is a stereo image but not a face stereo image (when it does not conform to the stereo structure of the face), it is considered that the face image captured by the lens assembly corresponds to an unreal face, and it may be further considered as a case of a presentation attack (using a non-living body to perform an operation that should be performed by a living body). At this time, an alarm message may be issued to inform the user or the corresponding data processing server that currently a presentation attack or the like happens.

Figure 3:
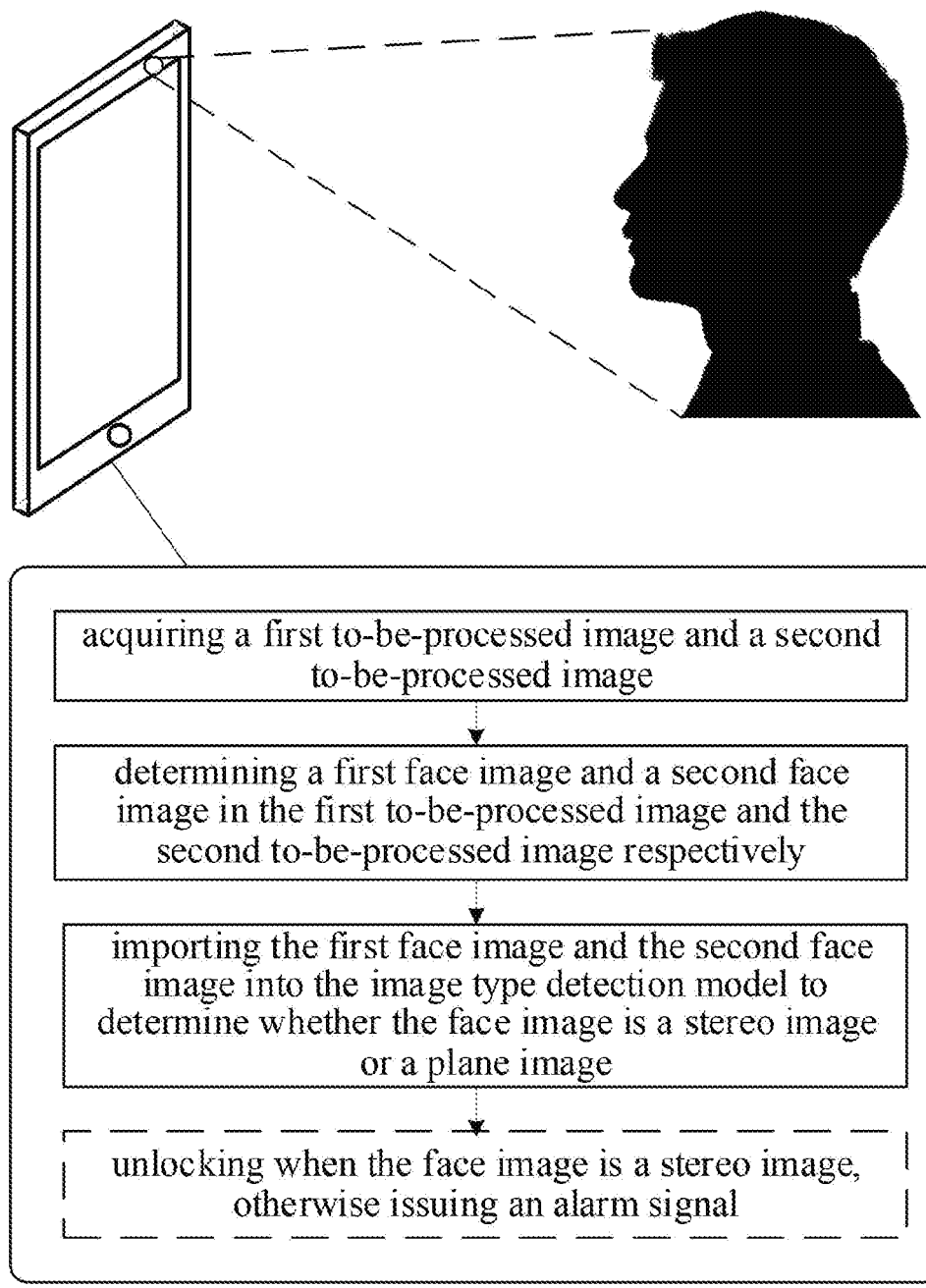
FIG. 3 is a schematic diagram of an application scenario of the method for detecting an image type according to the present disclosure.

With further reference to FIG. 3, a schematic diagram of an application scenario of the method for detecting an image type according to the present embodiment is illustrated. In the application scenario of FIG. 3, the terminal device is unlocked by the face. The lens assembly on the terminal device acquires a first to-be-processed image and a second to-be-processed image, two images containing a face at different focal lengths; then, determines a first face image and a second face image from the first to-be-processed image and the second to-be-processed image, respectively; then, imports the first face image and the second face image into the image type detection model to determine whether the face image in the first to-be-processed image and the second to-be-processed image is a real face. When the image type obtained by the image type detection model determines that the face image is a face stereo image, it may be considered that the image acquired by the lens assembly is an image of a real face, and then the unlocking operation is performed; otherwise, when the face image is a plane image, it may be considered that the terminal device is subjected to a presentation attack. The terminal device may issue an alarm signal by means of sound, light, etc., and may also send information such as a location signal of the current terminal device to the corresponding server, and perform an operation such as locking the terminal device, thereby improving the security in unlocking the terminal device.

The method provided by the embodiments of the present disclosure first acquires a first object image and a second object image from a first to-be-processed image and a second to-be-processed image captured at different focal lengths, then imports the first object image and the second object image into an image type detection model to determine image type of the first object image and the second object image, enabling accurate recognition of the image types of the to-be-processed images.

Figure 4:
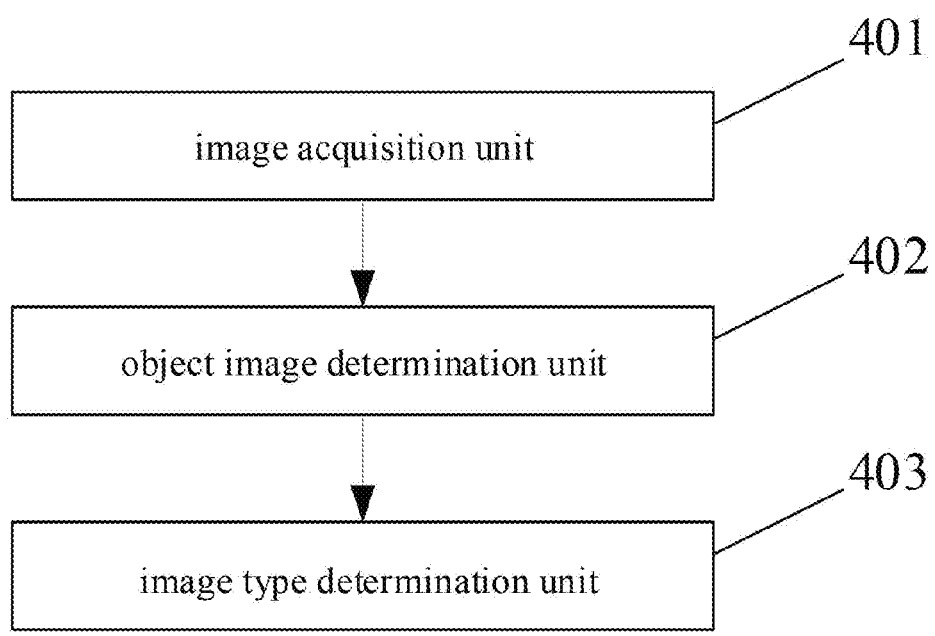
FIG. 4 is a schematic structural diagram of an embodiment of an apparatus for detecting an image type according to the present disclosure.

With further reference to FIG. 4, as an implementation to the method shown in the above figures, the present disclosure provides an embodiment of an apparatus for detecting an image type. The apparatus embodiment corresponds to the method embodiment shown in FIG. 2, and the apparatus may specifically be applied to various electronic devices.

As shown in FIG. 4, the apparatus 400 for detecting an image type of the present embodiment may include: an image acquisition unit 401, an object image determination unit 402 and an image type determination unit 403. The image acquisition unit 401 is configured to acquire a first to-be-processed image and a second to-be-processed image, wherein the first to-be-processed image and the second to-be-processed image are acquired when a positional relationship between a terminal device acquiring the images and a given object being captured is unchanged, and focal lengths of the terminal device when acquiring the first to-be-processed image and the second to-be-processed image are different. The object image determination unit 402 is configured to determine at least one first object image and at least one second object image in the first to-be-processed image and the second to-be-processed image respectively. The image type determination unit 403 is configured to import, for each first object image in the at least one first object image, the first object image and a second object image corresponding to the first object image into an image type detection model to obtain image type corresponding to the first object image and the second object image, the image type detection model being used to determine an image type by depth of field information, and the image type including a plane image and a stereo image.

In some alternative implementations of the present embodiment, the object image determination unit 402 may include: perform image recognition on the first to-be-processed image and the second to-be-processed image, and determine the at least one first object image and the at least one second object image corresponding to the first to-be-processed image and the second to-be-processed image.

In some alternative implementations of the present embodiment, the object image determination unit 402 may further include: a first correspondence relationship establishing subunit (not shown in the figure) and a second correspondence relationship establishing subunit (not shown in the figure). The first correspondence relationship establishing subunit is configured to set first position information for the each first object image in the at least one first object image, set second position information for each second object image in the at least one second object image, and establish a first correspondence relationship between the first position information and the second position information. The second correspondence relationship establishing subunit is configured to establish a second correspondence relationship between the first object image and the second object image based on the first correspondence relationship.

In some alternative implementations of the present embodiment, the apparatus 400 for detecting an image type may further include an image type detection model construction unit (not shown in the figure), configured to construct the image type detection model, and the image type detection model construction unit may include: an image extraction subunit (not shown in the figure), a label setting subunit (not shown in the figure) and an image type detection model construction subunit (not shown in the figure). The image extraction subunit is configured to extract a stereo image group and a plane image group from a stereo image set and a plane image set, respectively, wherein the stereo image group includes two images of different focal lengths acquired when a positional relationship between the terminal device acquiring the images and a given spatial object being captured is unchanged, and the plane image group includes two images of different focal lengths acquired when a positional relationship between the terminal device acquiring the images and a given plane object being captured is unchanged. The label setting subunit is configured to acquire stereo depth of field information and plane depth of field information from the stereo image group and the plane image group, respectively, and set a stereo image type label and a plane image type label respectively for the stereo image group and the plane image group corresponding to the stereo depth of field information and the plane depth of field information. The image type detection model construction subunit is configured to obtain the image type detection model through training, by using a machine learning method, with the stereo image group and the plane image group as inputs, and the stereo image type label and the plane image type label respectively corresponding to the stereo image group and the plane image group as outputs.

In some alternative implementations of the present embodiment, the stereo image set includes a face stereo image, and the label setting subunit includes: acquire face depth of field information from a face stereo image group, and set a face image type label for the face stereo image group corresponding to the face depth of field information.

In some alternative implementations of the present embodiment, the apparatus 400 for detecting an image type may further include: issue an alarm signal when an image type corresponding to the first object image and the second object image is a plane image.

The present embodiment also provides a terminal device, including: one or more processors; and a storage apparatus, for storing one or more programs, a zoom lens assembly, for capturing images of different focal lengths, the one or more programs, when executed by the one or more processors, cause the one or more processors to implement the method for detecting an image type.

The present embodiment also provides a computer readable storage medium, storing a computer program thereon, the program, when executed by a processor, implements the method for detecting an image type.

Figure 5:
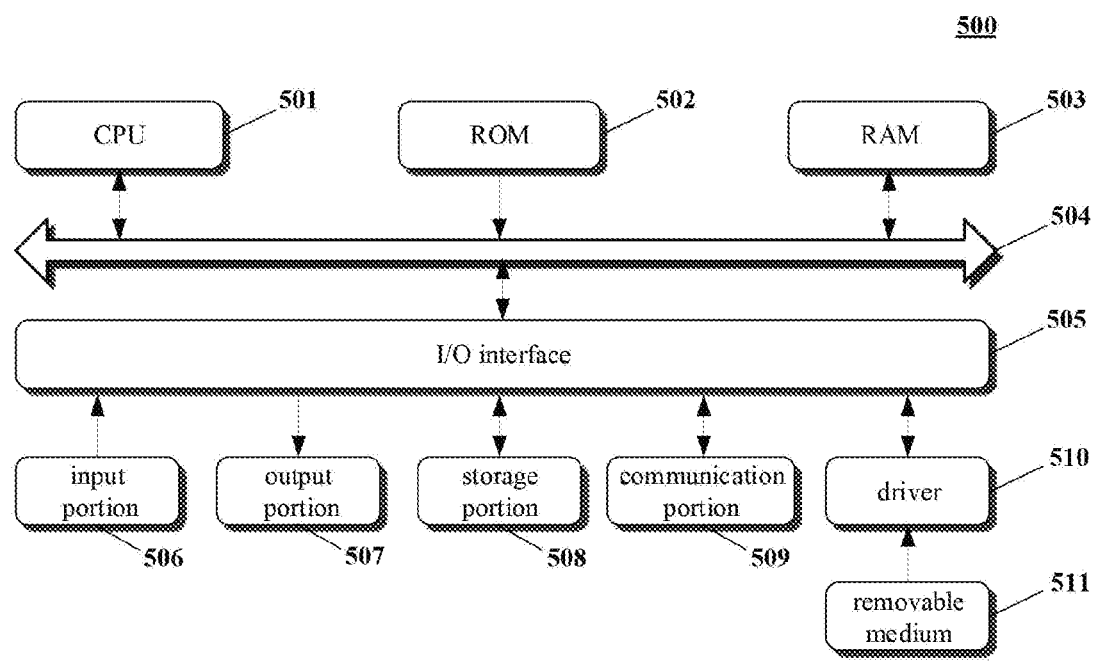
FIG. 5 is a schematic structural diagram of a computer system adapted to implement a terminal device of the embodiments of the present disclosure.

Referring to FIG. 5, a schematic structural diagram of a computer system 500 adapted to implement a terminal device or a server of the embodiments of the present disclosure is shown. The terminal devices is merely an example and should bring no limitation on the functionality and he usage range of the embodiments in the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an image acquisition unit, an object image determination unit, and an image type determination unit, where the names of these units or modules do not in some cases constitute a limitation to such units or modules themselves. For example, the image type determination unit may also be described as "a unit for determining an image type of the image."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a first to-be-processed image and a second to-be-processed image, wherein the first to-be-processed image and the second to-be-processed image are acquired when a positional relationship between a terminal device acquiring the images and a given object being captured is unchanged, and focal lengths of the terminal device when acquiring the first to-be-processed image and the second to-be-processed image are different; determine at least one first object image and at least one second object image in the first to-be-processed image and the second to-be-processed image respectively; and import, for each first object image in the at least one first object image, the first object image and a second object image corresponding to the first object image into an image type detection model to obtain image type corresponding to the first object image and the second object image, the image type detection model being used to determine an image type by depth of field information, and the image type comprising a plane image and a stereo image The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting an image type, the method comprising:
    acquiring a first to-be-processed image and a second to-be-processed image, wherein the first to-be-processed image and the second to-be-processed image are captured by a zoom lens assembly installed in a terminal device when a positional relationship between said terminal device and a given object being captured is unchanged, and focal lengths of said zoom lens assembly when capturing the first to-be-processed image and the second to-be-processed image are different;
    determining at least one first object image and at least one second object image in the first to-be-processed image and the second to-be-processed image respectively; and
    for each first object image in the at least one first object image, importing the first object image and a second object image corresponding to the first object image into an image type detection model to obtain an image type corresponding to the first object image and the second object image, the image type detection model being obtained through training by using a machine learning method and being used to determine an image type by depth of field information, and the image type comprising a plane image and a stereo image.

2. The method according to claim 1, wherein the determining at least one first object image and at least one second object image in the first to-be-processed image and the second to-be-processed image respectively, comprises:
    performing image recognition on the first to-be-processed image and the second to-be-processed image, and determining the at least one first object image and the at least one second object image corresponding to the first to-be-processed image and the second to-be-processed image.

3. The method according to claim 2, wherein the determining at least one first object image and at least one second object image in the first to-be-processed image and the second to-be-processed image respectively, comprises:
setting first position information for the each first object image in the at least one first object image, setting second position information for each second object image in the at least one second object image, and establishing a first correspondence relationship between the first position information and the second position information; and
establishing a second correspondence relationship between the first object image and the second object image based on the first correspondence relationship.

4. The method according to claim 1, wherein the method comprises constructing the image type detection model, and the constructing the image type detection model comprises:
extracting a stereo image group and a plane image group from a stereo image set and a plane image set, respectively, wherein the stereo image group comprises two images of different focal lengths captured when a positional relationship between the terminal device acquiring the images and a given spatial object being captured is unchanged, and the plane image group comprises two images of different focal lengths acquired when a positional relationship between the terminal device acquiring the images and a given plane object being captured is unchanged;
acquiring stereo depth of field information and plane depth of field information from the stereo image group and the plane image group, respectively, and setting a stereo image type label and a plane image type label respectively for the stereo image group and the plane image group corresponding to the stereo depth of field information and the plane depth of field information; and
obtaining the image type detection model through training, by using a machine learning method, with the stereo image group and the plane image group as inputs, and the stereo image type label and the plane image type label respectively corresponding to the stereo image group and the plane image group as outputs.

5. The method according to claim 4, wherein the stereo image set comprises a face stereo image, and
the acquiring stereo depth of field information from the stereo image group, and setting a stereo image type label for the stereo image group corresponding to the stereo depth of field information comprises:
acquiring face depth of field information from a face stereo image group, and setting a face image type label for the face stereo image group corresponding to the face depth of field information.

6. The method according to claim 1, wherein the method further comprises:
issuing an alarm signal when an image type corresponding to the first object image and the second object image is a plane image.

7. An apparatus for detecting an image type, the apparatus comprising:
at least one processor;
a zoom lens assembly, the zoom length lens assembly being used to collect images at different focal lengths, and
a memory storing instructions, the instructions when executed by the at least one processor, cause the at least one processor to perform operations, the operations comprising:
acquiring a first to-be-processed image and a second to-be-processed image, wherein the first to-be-processed image and the second to-be-processed image are captured by the zoom lens assembly installed in a terminal device when a positional relationship between said terminal device and a given object being captured is unchanged, and focal lengths of said zoom lens assembly when capturing the first to-be-processed image and the second to-be-processed image are different;
determining at least one first object image and at least one second object image in the first to-be-processed image and the second to-be-processed image respectively; and
for each first object image in the at least one first object image, importing the first object image and a second object image corresponding to the first object image into an image type detection model to obtain an image type corresponding to the first object image and the second object image, the image type detection model being obtained through training by using a machine learning method and being used to determine an image type by depth of field information, and the image type comprising a plane image and a stereo image.

8. The apparatus according to claim 7, wherein the determining at least one first object image and at least one second object image in the first to-be-processed image and the second to-be-processed image respectively, comprises:
performing image recognition on the first to-be-processed image and the second to-be-processed image, and determine the at least one first object image and the at least one second object image corresponding to the first to-be-processed image and the second to-be-processed image.

9. The apparatus according to claim 8, wherein the determining at least one first object image and at least one second object image in the first to-be-processed image and the second to-be-processed image respectively, comprises:
setting first position information for the each first object image in the at least one first object image, setting second position information for each second object image in the at least one second object image, and establishing a first correspondence relationship between the first position information and the second position information; and
establishing a second correspondence relationship between the first object image and the second object image based on the first correspondence relationship.

10. The apparatus according to claim 7, wherein the operations comprise constructing the image type detection model, and the constructing the image type detection model comprises:
extracting a stereo image group and a plane image group from a stereo image set and a plane image set, respectively, wherein the stereo image group comprises two images of different focal lengths captured when a positional relationship between the terminal device acquiring the images and a given spatial object being captured is unchanged, and the plane image group comprises two images of different focal lengths acquired when a positional relationship between the terminal device acquiring the images and a given plane object being captured is unchanged;

acquiring stereo depth of field information and plane depth of field information from the stereo image group and the plane image group, respectively, and set a stereo image type label and a plane image type label respectively for the stereo image group and the plane image group corresponding to the stereo depth of field information and the plane depth of field information; and obtaining the image type detection model through training, by using a machine learning method, with the stereo image group and the plane image group as inputs, and the stereo image type label and the plane image type label respectively corresponding to the stereo image group and the plane image group as outputs.

11. The apparatus according to claim 10, wherein the stereo image set comprises a face stereo image, and the acquiring stereo depth of field information from the stereo image group, and setting a stereo image type label for the stereo image group corresponding to the stereo depth of field information comprises:

acquiring face depth of field information from a face stereo image group, and set a face image type label for the face stereo image group corresponding to the face depth of field information.

12. The apparatus according to claim 7, wherein operations further comprise: issuing an alarm signal when an image type corresponding to the first object image and the second object image is a plane image.

13. A non-transitory computer readable storage medium storing a computer program, wherein the computer program, when executed by a processor, cause the processor to perform operations, the operations comprising:

acquiring a first to-be-processed image and a second to-be-processed image, wherein the first to-be-processed image and the second to-be-processed image are captured by a zoom lens assembly installed in a terminal device when a positional relationship between said terminal device and a given object being captured is unchanged, and focal lengths of said zoom lens assembly when capturing the first to-be-processed image and the second to-be-processed image are different;

determining at least one first object image and at least one second object image in the first to-be-processed image and the second to-be-processed image respectively; and for each first object image in the at least one first object image, importing the first object image and a second object image corresponding to the first object image into an image type detection model to obtain an image type corresponding to the first object image and the second object image, the image type detection model being obtained through training by using a machine learning method and being used to determine an image type by depth of field information, and the image type comprising a plane image and a stereo image.

* * * * *